(12) United States Patent  
Johnson

(10) Patent No.: US 9,152,935 B2  
(45) Date of Patent: Oct. 6, 2015

(54) SYSTEM AND METHOD FOR CREATING AND DISPLAYING DATA_TIES

(71) Applicant: J. Douglas Johnson, Chicago, IL (US)

(72) Inventor: J. Douglas Johnson, Chicago, IL (US)

(*) Notice: Subject to any disclaimer, the term of this patent is extended or adjusted under 35 U.S.C. 154(b) by 276 days.

(21) Appl. No.: 13/765,257

(22) Filed: Feb. 12, 2013

(65) Prior Publication Data

US 2014/0229872 A1    Aug. 14, 2014

(51) Int. Cl.
*G06F 3/0486* (2013.01)
*G06Q 10/06* (2012.01)
*G06F 17/30* (2006.01)
*G06F 17/22* (2006.01)

(52) U.S. Cl.
CPC ............ *G06Q 10/06* (2013.01); *G06F 17/2235* (2013.01); *G06F 17/30525* (2013.01)

(58) Field of Classification Search
CPC ..................................................... G06F 3/0486
USPC ......................................................... 715/769
See application file for complete search history.

(56) References Cited

U.S. PATENT DOCUMENTS

| | | | | |
|---|---|---|---|---|
| 8,438,489 | B2* | 5/2013 | Barthelmess et al. | 715/751 |
| 2002/0049787 | A1* | 4/2002 | Keely et al. | 707/512 |
| 2007/0143663 | A1* | 6/2007 | Hansen et al. | 715/512 |
| 2010/0100855 | A1* | 4/2010 | Yoo | 715/863 |
| 2010/0185933 | A1* | 7/2010 | Coffman et al. | 715/230 |
| 2010/0293461 | A1* | 11/2010 | Boezeman et al. | 715/708 |
| 2011/0041096 | A1* | 2/2011 | Larco et al. | 715/835 |
| 2011/0184960 | A1* | 7/2011 | Delpha et al. | 707/754 |
| 2012/0221659 | A1* | 8/2012 | Brown et al. | 709/206 |
| 2013/0031455 | A1* | 1/2013 | Griffiths et al. | 715/230 |
| 2013/0031457 | A1* | 1/2013 | Griffiths et al. | 715/231 |
| 2013/0174031 | A1* | 7/2013 | Constantinou | 715/256 |
| 2014/0082521 | A1* | 3/2014 | Carolan et al. | 715/752 |
| 2014/0101527 | A1* | 4/2014 | Suciu | 715/230 |

OTHER PUBLICATIONS

Working screenshot of Visual Paradigm for UML 6.0 by Visual Paradigm, released on Dec. 4, 2006, pp. 9.*

* cited by examiner

*Primary Examiner* — Reza Nabi
(74) *Attorney, Agent, or Firm* — Clifford H. Kraft

(57) ABSTRACT

A system and method for creating, storing and retrieving, and displaying user-created data_ties (a data_tie is a user-created relationship between two items the user had previously saved). The purpose of the invention is to provide the user a way to not only see the data he has saved, but to provide him a way to graphically display the relationships he has made between pieces of Evidence. The present invention is particularly adapted to tablet computers, notepads, etc. with touch-screens. A feature of the present invention is the ability to manually slide one icon on top of a second icon thereby creating a data_tie between the two pieces of data, or evidence. In various embodiments of the invention, this relationship can be annotated with context to later relate why and how the two pieces of data were connected.

14 Claims, 3 Drawing Sheets

| ID-001, ID-018 |
|---|
| ID-002, ID-099 |
| ID-002, ID-137 |

FIG. 3A

| ID-001, ID-OO2 |
|---|
| ID-001, ID-018 |
| ID-002, ID-099 |
| ID-002, ID-137 |

FIG. 3B

SYSTEM AND METHOD FOR CREATING AND DISPLAYING DATA_TIES

BACKGROUND

1. Field of the Invention

The present invention relates to managing data and more particular to a system and method for creating data_ties.

2. Description of the Prior Art

People underline a phrase or sentence in a book, or ponder over a quote in a magazine article, because it's connected to other ideas they already have. Often these ideas that came from other books and highlights they had read or marked previously. Usually such a collection of underlined sentences or quotes or even entire articles remains just that, a jumbled collection that is totally unconnected and extremely difficult to retrieve.

It would be advantageous to have a way that one can record and see all these connections, and not just become aware of the connection, but also see why it was made. Note-taking software is known in the art. However, the primary function of existing note-taking software is to categorize, search and find a specific note from the single stack of an entire collection of notes. What is badly needed is a way to create, maintain and retrieve is a stackless presentation of how the notes relate to one another.

The note-taking software and the associated storage systems on the market today are useful for creating, organizing and searching notes. In those systems, each note is like a separate piece of paper in a 10-foot stack. If you can remember what's in the stack you'll have no problem finding it when you need it.

But what happens to the data you forgot you saved? What if you could spread out that stack across your floor and instantly see how all your notes relate to one another. What if you could visually represent why you created a particular note in the first place? And what if when you picked up a particular note, say a Bible passage you once saved, you revealed a whole web of photos, articles, a college paper you once wrote, and a letter you received from your son twenty years later, that are each related to that Biblical passage?

Delicious.com, Diigo, Spring It, DevonThink, and Evernote are prior art systems for note-taking or bookmarking on the market today. All of these systems present a top-to-bottom list of a user's notes that he can tag and categorize and search for particular note(s).

In 2012, Amazon Corp. announced that its electronic books were now outselling print books for the first time. However, the functionality of electronic books is still in its infancy. As far as highlights and margin notes go, many readers find a print book a lot more user-friendly than an electronic book. However, it would be extremely advantageous if the user could start associating quotes from one electronic book with quotes from other electronic books in a visual manner. Then suddenly electronic books can do something that print books never could.

As an aid to understanding the problem and the present invention, it can be considered that each of highlight, quote or note is a separate tree in a particular user's forest of notes. The present invention allows a walk through that forest. As the walk progresses, the user can see pieces of Yarn tying various trees to one another, the yarn showing all the connections the user has made between a quote from a novel highlighted many years ago, a photograph seen in the newspaper last month, a sermon heard a few hours ago. Now the user is not just seeing all the data he deemed important enough to save, but he is seeing why it was deemed important, and how it relates to other data over time. The only reason anyone has ever highlighted anything is because in his mind it is tied to something he already knew or had experienced. It is an object of the present invention aims to record not just the data, but how the user understood and used that data.

As an example, imagine a photo of an oak tree that a user saved to his database. It's not just any oak tree but a photo of an oak tree in the backyard of where the user grew up. The present invention takes the oak tree out of the stack of notes and shows it to the user in its most meaningful context. It does this by showing how the important items that were saved later in the user's life relate to one another, which is the only reason they were saved in the first place. Perhaps it was under that oak tree that the user and his brother made a life-long pact, signed in blood, that brought them where they are today—say, the biggest screenplay writing team in Hollywood. In this example, a photo of the oak tree, the pact, examples of the later success and a note recording the date of the pact are all related and should be able to be accessed and displayed in a related manner so that now the photo of the oak tree carries its true meaning. The oak tree has significance not because it is an oak tree, but because an important event happened under it.

SUMMARY OF THE INVENTION

Definition of Terms

Evidence/Item: Evidence refers to an object that is stored (a jpg photo, text, a video, a URL, and the like). Evidence is synonymous with the item the user elects to store, tie, display, or the like.

Data_tie: A data_tie refers to at least one record in a table that stores all the information that is essential to the connection between two pieces of Evidence. A data_tie is different than other known terms such as "hyperlinks" or "links," in that a hyperlink executes instruction(s) when activated (typically to "go to" a particular URL address). This is an entirely different concept than a data_tie, which is a user-created record in a database that can be used to store and graphically display relationships between pieces of Evidence.

Yarn: Yarn is a graphical representation to the user of a data_tie. A yarn could be a line, or an arrow, or any visible trail going from one icon to another. Annotated_Yarn can be a user-written explanation of a Data_Tie. When the user creates an Annotated_Yarn it creates and stores at least one record in a database.

CASE: A Case is a window in which the user can arrange icons (representing pieces of evidence) with a static position on the screen. The invention stores the static position of these icons.

The present invention relates to a system and method for creating, storing and retrieving, and displaying user-created data_ties (a data_tie is a user-created relationship between two stored items, called Evidence, that the user had previously saved, The purpose of the invention is to provide the user a way to not only see the data he has saved, but to provide him a way to graphically display the relationships he has made between pieces of Evidence. The present invention is particularly adapted to touchscreens found on tablet computers, notepads, book reading computers and any other computer that can display an icon on the screen to represent a particular piece of data such as a note, photo, quote or the like.

A feature of the present invention is the ability to manually slide one icon on top of a second icon thereby creating a data_tie and a visible yarn between the two pieces of data. In various embodiments of the invention, this relationship can be annotated with context to later relate why and how the two pieces of data were connected.

Another feature of the present invention is the ability to edit and change previously created data_ties. This can include dissolving a previously established data_ties, editing or replacing an annotation concerning context, or creating new data_ties.

Another feature of the present invention is the ability to display icons representing pieces of data along with the yarns (graphical representation of a data_tie) between them.

Another feature of the present invention is the ability to zoom in or out on an icon(s) and the yarn connecting the icons.

Another feature of the present invention is the ability to display icons with different sizes where size can represent how many data_ties a particular item has.

Another feature of the present invention is the ability to have at least three different views that allow a user to visualize and explore relationships between data.

DESCRIPTION OF THE FIGURES

Attention is now directed to several drawings that illustrate features of the present invention.

FIG. 3A-3B show a data_ties table before and after the dragging and dropping of FIGS. 2A-2B.

Several drawings and illustrations have been presented that aid in understanding the present invention. The scope of the present invention is not limited to what is shown in the figures.

DESCRIPTION OF THE PREFERRED EMBODIMENTS

The present invention relates to a system and method for creating, storing and retrieving, and displaying user-created data_ties. The invention provides the user a way to not only see the data he has saved, but the entire context of the data by displaying the relationships he has made between items of data.

The present invention is particularly useful when implemented on a so-called notepad, tablet or notebook type computer since this type of device is typically used for reading books and articles, receiving streamed news or other programs and can display a rich set of screen icons that can be manipulated on a touch-sensitive screen. Two major platforms are currently being used, a platform supplied by Apple Corp. known as iPad™, and a platform supplied by Google Corp. called Android™. In addition, there are several electronic book systems such as Kindle supplied by Amazon Corp (Kindle is in reality an Android™-based system).

As previously described, the present invention allows the user to create data_ties between miscellaneous pieces of data (called evidence) and to graphically view those data_ties. There is no limit to the number of data_ties a user can create for a particular piece of evidence. Pieces of evidence can also be assigned to a Case. Cases can be linked to other cases, and evidence within a case can be linked to evidence within another case.

There can be at least three major screen views associated with the present invention: a crumbtrails view, a split-screen view, and a case view.

Crumbtrails View

Figure 1:
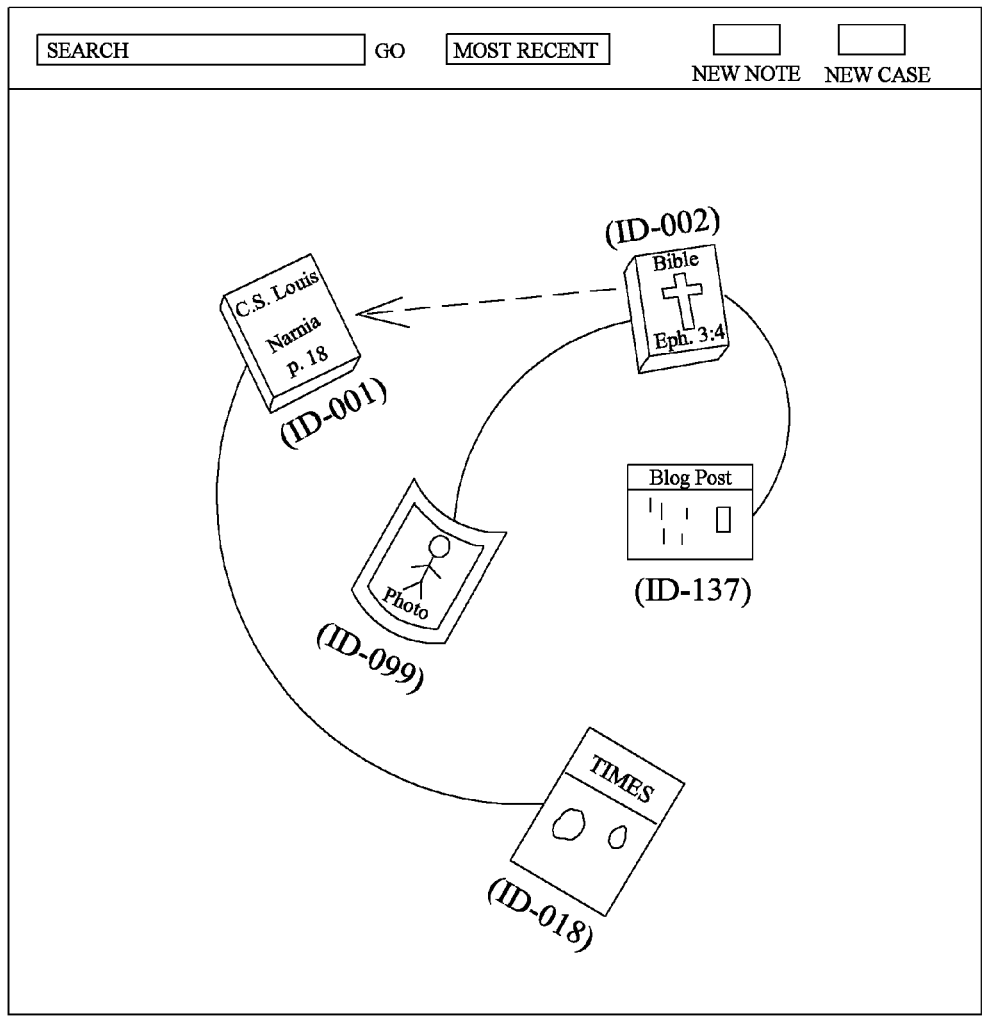
FIG. 1 shows a screen with a crumbtrails view.

FIG. 1 shows a screen example of a crumbtrails view. The crumbtrails view provides a graphical representation of the data_ties between pieces of evidence. It shows various pieces of evidence as icons with data_ties between them shown as lines (yarns). This is typically the view seen first by the user at start-up. A drop-down menu or other menu may be used to adjust what is displayed in the crumbtrails view. For example, the user may not want to see all the data_ties in the entire database. Selections on this menu might be "Everything", "Most recent entries", "Cases", "Questions", "Ebook Highlights" and the like.

Figure 2A:
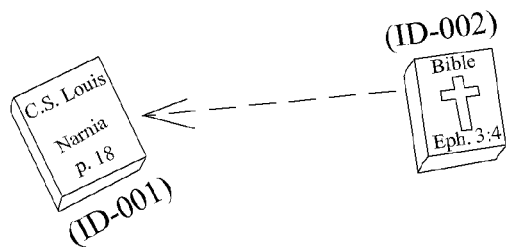
FIGS. 2A-2B show an icon from the crumbtrails view of FIG. 1 being dragged and dropped on another icon to create a data_tie.
Figure 2B:
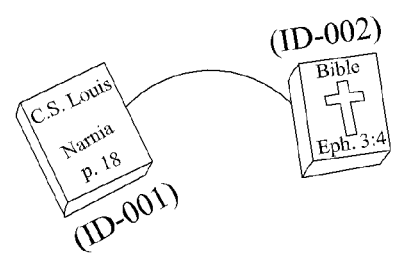

An important feature of the present invention is that to create a new data_tie, the user may simply drag a particular icon (representing a particular piece of evidence) and drop it on top of another icon. At that point, animation can show that the user has created a data_tie, and an opportunity can be presented to optionally annotate the data_tie explaining why the data_tie was made. FIGS. 2A-2B show an icon being dragged and dropped on another icon to create a data_tie.

The user can easily re-arrange the icons on the screen by simply dragging them around. Yarns can be displayed or retracted (hidden) on this screen. The screen is scrollable in all directions. If the user taps on a particular icon, the note or piece of evidence represented by that icon will appear in a pop-over window so that it can be read or seen. If the user taps on a yarn between two icons, annotation about the nature of the relationship can appear.

Split-Screen View

A second type of screen is the split-screen. A major feature of the present invention is to show the data_ties between notes or pieces of evidence, and to allow the user to easily create new data_ties. The user needs to have the ability to see the note(s) being worked on as well as the note(s) the user want to connect. This must be done within the real estate of a tablet or other small computer screen. To facilitate this, a split-screen can be used.

The spilt screen view is similar to having two independently operating crumbtrails views on the same screen. The user can slide the line separating them to the left or the right allowing a resizing of each side. When the user decides to create a data_tie, he can drag and drop one icon (a piece of evidence) from one side of the split screen onto another icon or piece of evidence on the other side of the split screen. This action creates a data_tie between the two pieces of evidence.

Case View

The third type of screen is the case view. Since the crumbtrails view looks and functions as map of all data_ties, the icons in the crumbtrails view can appear anywhere on the screen. Inside a case however, icons for notes should maintain a static position on the screen. Icon static positions is the main difference between the crumbtrails view and the case view.

To see why it is important to have a view with fixed icon positions, consider the following example. Imagine that the user is writing a speech or working on a paper and is collecting notes for that speech or paper. Without a computer, this is often done with index cards. Different ideas or topics are written on the index cards, and then they are laid out and arranged them on a table or desk in a particular order. The first thing need in a speech may be to tell the audience what the speech is about, hence the user might put the index card containing your topic at the top of the desk. Below that the user might arrange cards in groups according to various points desired to be made in a particular order.

In the present invention, the tablet is the desk, and all those index cards are separate icons representing pieces of evidence. The Crumbtrails view won't allow the user to preserve a static position for each piece of evidence, but the case view will. In addition, the case view can have drawing tools (at least limited drawing tools), such as a freehand tool, and a line tool to help visually arrange the subject matter being worked on. The case view can work something like a page in a scrapbook. The case view should be scrollable in all directions and zoomable.

Scanability

Scanability is the ability to look at a screen and discern most of what is on it in a second or two without reading text. For example, assume that numerous items were saved in their original format: photographs, newspaper clippings, DVD video clips, pages from books on which are written margin notes, page of books that has been highlighted, and a collection of quick personal thoughts scrolled out on pieces of scrap paper. If all of that were dumped on the living room floor and it was desired to find something that was remembered as being read in a newspaper at one point in the time, the eye would eliminate most of what is there in a second because only newspaper clippings would be interesting.

Using the present invention, a search on a keyword might present a screen with 50 items, but if the user knows he is looking for something from a newspaper, then in an instant he would only concern himself with the say five newspaper clips on the screen and nothing else. The user can thus very quickly find the thing wanted without reading any text.

While there are many different ways to accomplish this capability using the present invention, here are a few examples of ways it can be done:
- Media clips from online newspapers, network news websites, magazines can all share a similar icon.
- Personal thoughts can be encased inside a specially designed thought bubble icon.
- Book highlights would have a book icon.
- Different icon types can have a font in common with all other icons of that type.
- Since most of this is text perhaps each
- User selected icons. Icons can be generated by the user to represent specific categories Because the screen has a finite size, the more icons of evidence that appear on the screen, the less detail that can be seen about each particular piece of evidence. For example, if the screen is zoomed in quite close, the user might see up to 250 characters of text for each piece of text evidence, but then as the screen is zoomed out, the user might only see an icon indicating that it is a quote from an ebook with maybe only the title of the book visible. The ability to do a large amount of left-right or up-down scrolling aids in the display problem.

Existing Databases and Systems

Since the present invention may be used in conjunction with other systems or databases, it is important that data a user has already gathered can be imported into the database of the present invention. In fact, embodiments of the present invention can use already existing database formats that provide application interfaces (APIs). An example of this is Evernote™. This is a prior art product for keeping notes that is currently popular and provides an API. Many systems such as Evernote may allow collections of data that is does not need relationships or may not be important to enter into a database such as represented by embodiments of the present invention. In that case, the present invention can either selectively use the other database or selectively import only classes of desired data. Ophans (bits of evidence that is not connected with other evidence) should be kept out of the database of the present invention since these data simply clutter the database with specks of data that have no relationship to each other or other data.

Details of a Particular Embodiment

It is envisioned that the invention could either store a user's data (or "pieces of Evidence") on the tablet or the cloud. But the user will also have the ability to store and access Evidence from other third party programs that provide a public API such as Evernote, Dropbox and others.

Within the application, there can be a database module. While the user's Evidence can be stored in the application's database or a third party database (such as the Evernote (M) database previously discussed), the table of data_ties can reside on the application or its unique cloud space.

In addition to the database, there can be a display engine that supplies the three or more different types of screens, handles icons on the screen along with their locations and movement, and handles scrolling and zooming.

There can also be an input engine that allows entry of new pieces of evidence and links one piece of evidence to another. This input engine can include editing capability so that existing links can be dissolved or changed as well as new links created.

In addition, there can be a search engine that can perform directed searches within the database for cases or pieces of evidence. A directed search typically brings back a particular piece of evidence, along with all the data_ties to other pieces of evidence, whether or not those other pieces of evidence would have been returned by the search engine. For example, a search on "C. S. Lewis" should return all the quotes by C. S. Lewis, but a user could choose to display the data_ties attached to one or more of the C. S. Lewis quotes and that would display evidence the user related to the quote that would otherwise not have been returned by the original search. This process is unique because it allows a user to retrieve relevant data that would not otherwise be returned by any current database search methods (relevant because it is linked to the data returned by the search).

Each logical piece of evidence can be represented by an icon as shown in FIG. 1. The lines/arrows connecting the icons result from drag-and-drop gestures by the User that creates a record in the data_tie_table. This record contains two article_IDs (an auto-generated number that identifies each note the user saves) that were created by the gesture. The data_tie_table contains a separate record for each two-way link. For instance, the user may create a data_tie between a single piece of evidence to as many other pieces of evidence as he or she wishes.

FIGS. 2A-2B show the process where an icon is dragged and dropped on another icon that creates a record in the data_tie_table. The data_tie_table will store the following items for each piece of evidence:
1) id_number (unique, auto-generated numeral for each record)
2) storable_data.id_number1 (unique, auto-generated numeral for Evidence 1)
3) storable_data.id_number2 (unique, auto-generated numeral for Evidence 2)
4) datetime_added (date/time the record was created)
5) datetime_modified (date/time the record was modified)
6) location_added (physical location of user when record created)
7) location_modified (physical location of user when record modified)

The record in the data_tie_table contains the two Article_IDs. An Article_ID is a unique, auto-generated number associated with each piece of Evidence.

The data_ties between the icons are represented by lines or arrows in the UI (user interface). These lines or arrows between icons/Article_IDs are called YARNS. The user will have the option of adding an annotation to the YARN in the event the user wants to explain why he created a data_tie between the two icons.

FIGS. 3A-3B show the change in the data_tie table when the two icons shown in FIGS. 2A-2B become connected by yarn. The data_tie table picks up a new entry of ID-001, ID-002. This represents yarn between the two pieces of evidence.

CONCLUSION

The present invention represents a very useful tool for the stackless presentation of data such as notes, quotes, questions, photos and any other data in a way that presents the relationships between the pieces of data.

Consider a user that has hundreds of passages from a digital Bible highlighted. If this person wants to, he can turn on his ebook reader and go through those highlights in chronological order. However, that is probably not something the typical user would want to do very often, if ever. But what if this user reads a passage in her Bible tomorrow that seems to speak directly to a line in a fictional novel that was previously stored. Consider if they could quickly grab that passage from the book and slide it on top of the quote that they just read to establish a permanent data_tie between the two quotes. This data_tie establishes the relationship/meaning between the two pieces of evidence that is exclusive to the user's experience and understanding of the two quotes, and is non-searchable by any other systems currently on the market.

Now consider a few years later the user is reading a magazine on his ebook reader and the advice column says something that makes the user think of a passage from a fictional novel he highlighted recently. The user drag and drops the icon for the magazine quote on top of the quote from the novel. After doing so he sees the connection he made between the novel and the Bible passage years prior (and which he would have otherwise forgotten about). The user would also see any other notes with data_ties he created over the years to either the novel or the Bible passage. The user reads the Bible passage that he had forgotten and now sees how it throws a whole new light on that magazine quote. Suddenly all the user's books and highlights are talking to each other; this is something that never happened before in the history of books.

Several descriptions and illustrations have been presented to aid in understanding the present invention. One with skill in the art will realize that numerous changes and variations are possible without departing from the spirit of the invention. Each of these changes and variations is within the scope of the present invention.

I claim:

1. On a computer having a touch sensitive screen that can display icons representing data objects, where icons can be dragged and dropped, a system for managing relationships between data objects comprising:
    a touch screen;
    a first displayed icon on said touch screen representing a first data object stored in a database;
    a second displayed icon on said touch screen representing a second data object stored in the database;
    a set of executable instructions running on said computer adapted to create a data_tie between said first data object and said second data object when said first icon is dragged and dropped on to said second icon, the data_tie representing a particular relationship between the first data object and the second data object;
    a connection table in the database adapted to store information relating to said particular relationship;
    and wherein a graphical indicator is displayed on said computer between said first and second icon to show existence of said data_tie between said first and second data objects, the graphical indicator being annotated to display information relating to the particular relationship between the first data object and the second data object,
    wherein the first and second icon have sizes related to a total number of data_ties associated with them.

2. The system of claim 1 wherein said graphical indicator is a line segment.

3. The system of claim 1 further comprising executable instructions running on said computer adapted for editing said data_tie.

4. The system of claim 3 wherein said editing comprises removing said data_tie.

5. The system of claim 1 wherein each said icons visually indicate a type of data object associated with said icon.

6. The system of claim 1 further comprising executable instructions running on said computer adapted to display associated data_ties to a data object when an icon representing that object is tapped.

7. The system of claim 1 further comprising executable instructions running on said computer adapted to display annotation relating to a data_tie when the graphical indicator representing the data_tie is tapped.

8. On a computer having a touch sensitive display screen that can display icons representing data objects, where icons can be dragged and dropped, a system for managing relationships between data objects comprising:
    a touch screen;
    a first displayed icon on said touch screen representing a first data object;
    a second displayed icon on said touch screen representing a second data object;
    a set of executable instructions running on said computer adapted to create a relationship between said first data object and said second data object when said first icon is dragged and dropped on to said second icon;
    and wherein a graphical indicator is displayed on said computer between said first and second icon to show existence of said relationship between said first and second data objects;
    a database containing said first and second data objects and a link table containing information associated with said relationship including a nature of the relationship and a date when it was established,
    wherein the first and second icon have sizes related to a total number of data_ties associated with them.

9. The system of claim 8 wherein said graphical indicator is a line segment.

10. The system of claim 8 wherein said relationship may have an associated annotation.

11. The system of claim 8 further comprising executable instructions running on said computer adapted for editing said relationship.

12. The system of claim 8 wherein each said icons visually indicate a type of data object associated with said icon.

13. The system of claim 8 further comprising executable instructions running on said computer adapted to display associated relationships to a data object when an icon representing that object is tapped.

14. On a computer having a display screen that can display icons representing data objects, where icons can be dragged and dropped, a system for managing relationships between data objects comprising:

a touch screen;
- a first displayed icon on said touch screen representing a first data object;
- a second displayed icon on said touch screen representing a second data object;
- a set of executable instructions executing on said computer adapted to display yarn between said first data object and said second data object when said first icon is dragged and dropped onto said second icon, the yarn representing a relationship between the first data object and the second data object;
- a database adapted to store relationships between a plurality of data objects including the relationship between the first data object and the second data object, the database storing relationships in a hierarchical manner in the form of relationships between data objects and by grouping sets of objects into cases and further storing relationships between cases, wherein,
- the data objects, the relationships between objects, and the relationships between cases can be graphically displayed on said touch screen.

\* \* \* \* \*